(12) United States Patent
Tripathi et al.

(10) Patent No.: US 10,762,118 B2
(45) Date of Patent: Sep. 1, 2020

(54) METHOD AND SYSTEM OF PRESENTING INFORMATION RELATED TO SEARCH

(71) Applicant: Innoplexus AG, Eschborn (DE)

(72) Inventors: Gaurav Tripathi, Pune (IN); Vatsal Agarwal, Rampur (IN); Gunjan Bhardwaj, Taunus (DE); Amit Jain, Ranchi (IN); Dileep Dharma, Pune (IN); Tapashi Mandal, Baruipur (IN)

(73) Assignee: Innoplexus AG, Eschborn (DE)

( * ) Notice: Subject to any disclaimer, the term of this patent is extended or adjusted under 35 U.S.C. 154(b) by 303 days.

(21) Appl. No.: 15/855,525

(22) Filed: Dec. 27, 2017

(65) Prior Publication Data

US 2019/0005124 A1 Jan. 3, 2019

Related U.S. Application Data

(60) Provisional application No. 62/479,236, filed on Mar. 30, 2017.

(51) Int. Cl.
| | |
|---|---|
| *G06F 16/00* | (2019.01) |
| *G06F 16/338* | (2019.01) |
| *G06F 40/30* | (2020.01) |
| *G06F 16/33* | (2019.01) |
| *G06F 16/34* | (2019.01) |

(52) U.S. Cl.
CPC ........ *G06F 16/338* (2019.01); *G06F 16/3334* (2019.01); *G06F 16/345* (2019.01); *G06F 40/30* (2020.01)

(58) Field of Classification Search
CPC .... G06F 40/30; G06F 16/3334; G06F 16/338; G06F 16/345
See application file for complete search history.

(56) References Cited

U.S. PATENT DOCUMENTS

2017/0220680 A1* 8/2017 Shattuck ............. G06F 16/3326
2018/0293321 A1* 10/2018 Goldberg ............ G06F 16/9535

* cited by examiner

*Primary Examiner* — Cheryl Lewis
(74) *Attorney, Agent, or Firm* — Ziegler IP Law Group, LLC (57) ABSTRACT

A method and system for presenting information related to a search. A user is operable to perform the search on a computing device using search query. The method includes providing first input area, for receiving the search query from the user, on a first user-interface of the computing device, displaying one or more query segments and relations between the query segments on a second area of the first user-interface, providing an arranged set of extracted search results in a third area of the first user-interface, providing list of one or more concepts associated with the extracted search results in a fourth area of the first user-interface, and providing information, related to a selected search result or a selected concept, on a second user-interface, in response to a selection input, from the user, based on one of a search result or a concept associated with the search results.

17 Claims, 5 Drawing Sheets

METHOD AND SYSTEM OF PRESENTING INFORMATION RELATED TO SEARCH

CROSS REFERENCE TO RELATED APPLICATIONS

This application claims priority to U.S. Provisional Patent Application No. 62/479,236, filed Mar. 30, 2017, which is hereby incorporated by reference in its entirety.

TECHNICAL FIELD

The present disclosure relates generally to data extraction and processing; and more specifically, to methods and systems for presenting information related to search. Moreover, the present disclosure also relates to computer readable medium containing program instructions for execution on a computer system, which when executed by a computer, cause the computer to perform method steps for presenting information related to search.

BACKGROUND

In recent times, instant retrieval of information has become a primary need of every industry. Specifically, such information may be relevant to an area of interest of a user. Generally, information relevant to the area of interest of the user may be retrieved from a database by performing a search on the database. Typically, a search query, comprising a set of keywords to interpret the area of interest or query of the user, may be used to perform such search on the database. Consequently, the search may retrieve multiple search results that the user may analyze to find relevant information.

With regards to the retrieval of information, there has been an increasing need of efficient systems for extracting data from the databases and processing thereafter. Conventionally, such extraction and processing of data is time-consuming. Furthermore, search results retrieved from the search may have to be analyzed individually by the user to determine relevant search results. However, conventional search systems may merely match the set of keywords in the search query with data-records in the database and provide multiple data-records that may be redundant for the user. Furthermore, clicking on a specific search result from the extracted search results by the user may direct the user to a new screen. Consequently, the screen switching may cause loss of the extracted search results. Subsequently, the extracted search results may only be accessed by either switching to previous screen of extracted search results or re-starting the search altogether.

Furthermore, the user, while performing the search, may tweak the search query to extract information relevant to the user. However, tweaking the search query may require a significant effort from the user. Moreover, the search query may be tweaked iteratively, based on the search result extracted thereby, until a conclusive search query is formed that may extract relevant information. Additionally, the user may open one or more search results from the extracted search results, in discrete windows, that they may look through after analyzing the extracted search results. However, opening one or more discrete windows may consume considerable processing power.

Therefore, in light of the foregoing discussion, there exists a need to overcome the aforementioned drawbacks associated with conventional methods of searching and processing data.

SUMMARY

The present disclosure seeks to provide a method of presenting an information related to a search. The present disclosure also seeks to provide a system for presenting an information related to a search. The present disclosure seeks to provide a solution to the existing problem of contextually irrelevant, time consuming, inefficient searching techniques. An aim of the present disclosure is to provide a solution that overcomes at least partially the problems encountered in prior art, and provides a reliable and time-efficient method of searching and processing data.

In one aspect, an embodiment of the present disclosure provides a method of presenting an information related to a search, wherein a user is operable to perform the search on a computing device using a search query, wherein the method comprises:

providing a first input area, for receiving the search query from the user, on a first user-interface of the computing device;

displaying one or more query segments and relations between the one or more query segments on a second area of the first user-interface, wherein the received search query is developed to obtain the one or more query segments and the relations between the one or more query segments;

providing an arranged set of extracted search results in a third area of the first user-interface, wherein search results are extracted, from at least one database, based on the developed search query and arranged based on one or more parameters associated with the extracted search results;

providing a list of one or more concepts associated with the extracted search results in a fourth area of the first user-interface, wherein the extracted search results are analyzed to identify the one or more concepts associated with each of the extracted search results; and providing information, related to a selected search result or a selected concept, on a second user-interface, in response to a selection input, from the user, based on one of a search result or a concept associated with the search results, wherein the information related to:

the selected search result comprises:
a summary of the selected search result;
one or more documents associated with the selected search result; and
concepts associated with the selected search result; and the selected concept comprises:
a summary of the selected concept; and
one or more documents associated with the selected concept.

In another aspect, an embodiment of the present disclosure provides a system for presenting an information related to a search, wherein a user is operable to perform the search on a computing device using a search query, wherein the system comprises:

a database arrangement operable to store at least one database;

a communication module operable to retrieve at least one database; wherein the communication module is operatively coupled to the computing device; and the computing device comprising a display for rendering at least a first user-interface and a second user-interface, wherein the computing device is operable to:

provide a first user-interface comprising a first input area for receiving the search query from the user;

display one or more query segments and relations between the one or more query segments on a second area of the first user-interface, wherein the received search query is developed to obtain the one or more query segments and the relations between the one or more query segments;

provide an arranged set of extracted search results in a third area of the first user-interface, wherein search results are extracted, from at least one database, based on the developed search query and arranged based on one or more parameters associated with the extracted search results;

provide a list of one or more concepts associated with the extracted search results in a fourth area of the first user-interface, wherein the extracted search results are analyzed to identify the one or more concepts associated with each of the extracted search results; and provide information, related to a selected search result or a selected concept, on a second user-interface, in response to a selection input, from the user, based on one of a search result or a concept associated with the search results, wherein the information related to:
the selected search result comprises:
a summary of the selected search result;
one or more documents associated with the selected search result; and
concepts associated with the selected search result; and
the selected concept comprises:
a summary of the selected concept; and
one or more documents associated with the selected concept.

In yet another aspect, an embodiment of the present disclosure provides a computer readable medium containing program instructions for execution on a computer system, which when executed by a computer, cause the computer to perform method steps for presenting information related to a search, the method comprising the steps of:

providing a first input area, for receiving the search query from the user, on a first user-interface of the computing device;

displaying one or more query segments and relations between the one or more query segments on a second area of the first user-interface, wherein the received search query is developed to obtain the one or more query segments and the relations between the one or more query segments;

providing an arranged set of extracted search results in a third area of the first user-interface, wherein search results are extracted, from at least one database, based on the developed search query and arranged based on one or more parameters associated with the extracted search results;

providing a list of one or more concepts associated with the extracted search results in a fourth area of the first user-interface, wherein the extracted search results are analyzed to identify the one or more concepts associated with each of the extracted search results; and providing information, related to a selected search result or a selected concept, on a second user-interface, in response to a selection input, from the user, based on one of a search result or a concept associated with the search results, wherein the information related to:
the selected search result comprises:
a summary of the selected search result;
one or more documents associated with the selected search result; and
concepts associated with the selected search result; and
the selected concept comprises:
a summary of the selected concept; and
one or more documents associated with the selected concept.

Embodiments of the present disclosure substantially eliminate or at least partially address the aforementioned problems in the prior art, and enables an efficient and reliable method and system for presenting information related to a search.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method of presenting an information related to a search, wherein a user is operable to perform the search on a computing device using a search query, wherein the method comprises:

provide a first input area, for receiving the search query from the user, on a first user-interface of the computing device;

displaying one or more query segments and relations between the one or more query segments on a second area of the first user-interface, wherein the received search query is developed to obtain the one or more query segments and the relations between the one or more query segments;

providing an arranged set of extracted search results in a third area of the first user-interface, wherein search results are extracted, from at least one database, based on the developed search query and arranged based on one or more parameters associated with the extracted search results;

providing a list of one or more concepts associated with the extracted search results in a fourth area of the first user-interface, wherein the extracted search results are analyzed to identify the one or more concepts associated with each of the extracted search results; and providing information, related to a selected search result or a selected concept, on a second user-interface, in response to a selection input, from the user, based on one of a search result or a concept associated with the search results, wherein the information related to:

the selected search result comprises:
a summary of the selected search result;
one or more documents associated with the selected search result; and
concepts associated with the selected search result; and the selected concept comprises:
a summary of the selected concept; and
one or more documents associated with the selected concept.

In another aspect, an embodiment of the present disclosure provides a system for presenting an information related to a search, wherein a user is operable to perform the search on a computing device using a search query, wherein the system comprises:

a database arrangement operable to store at least one database;

a communication module operable to retrieve at least one database; wherein the communication module is operatively coupled to the computing device; and the computing device comprising a display for rendering at least a first user-interface and a second user-interface, wherein the computing device is operable to:

provide a first user-interface comprising a first input area for receiving the search query from the user;

display one or more query segments and relations between the one or more query segments on a second area of the first user-interface, wherein the received search query is developed to obtain the one or more query segments and the relations between the one or more query segments;

provide an arranged set of extracted search results in a third area of the first user-interface, wherein search results are extracted, from at least one database, based on the developed search query and arranged based on one or more parameters associated with the extracted search results;

provide a list of one or more concepts associated with the extracted search results in a fourth area of the first user-interface, wherein the extracted search results are analyzed to identify the one or more concepts associated with each of the extracted search results; and provide information, related to a selected search result or a selected concept, on a second user-interface, in response to a selection input, from the user, based on one of a search result or a concept associated with the search results, wherein the information related to:

the selected search result comprises:
a summary of the selected search result;
one or more documents associated with the selected search result; and
concepts associated with the selected search result; and the selected concept comprises:
a summary of the selected concept; and
one or more documents associated with the selected concept.

The present disclosure seeks to provide a method and system for presenting information related to a search. Beneficially, the present disclosure provides search results that are relevant to the search query. Consequently, an improved set of query segments may be obtained from the user query. Furthermore, semantic associations between query segments may also be identified to provide user with relevant information extracted from the search results. Moreover, the user interface of the present system enables user to toggle from the first user interface to the second user interface. Beneficially, the user may not lose the extracted search results upon opening a specific search result. Furthermore, the method aims at providing a summary of the results based on the concepts or frequency of occurrence of such concepts in each result. Beneficially, such summary of the results may provide the user with estimate of the context of the extracted search results. Additionally, the extracted search results may be arranged based on one or more parameters. Consequently, contextually relevant search results may arranged at a higher rank in the extracted search results.

Throughout the present disclosure, the term "computing device" relates to an electronic device associated with (or used by) the user that is capable of enabling the user to perform specific tasks associated with the aforementioned system/method. Furthermore, the computing device is intended to be broadly interpreted to include any electronic device that may be used for voice and/or data communication over a wired and/or wireless communication network. Examples of computing device include, but are not limited to, cellular phones, personal digital assistants (PDAs), handheld devices, wireless modems, laptop computers, personal computers, etc. Additionally, the computing device includes a casing, a memory, a processor, a network interface card, a microphone, a speaker, a keypad, and a display. Moreover, the computing device is to be construed broadly, so as to encompass variety of different types of mobile stations, subscriber stations or, more generally, communication devices, including examples such as combination of a data card inserted in a laptop; combination of a microphone inserted in a cellular phone and the like. Such computing devices are also intended to encompass devices commonly referred to as "access terminals".

Throughout the present disclosure, the term "search query" relates to input text provided by the user in order to extract information in the form of search results. Specifically, the search query can be a word or a combination of one or more words to form a significant search query. Additionally, the search query indicates the specific field of interest of the user. Moreover, the extracted search results may have data related to the terms present in the search query therein. Furthermore, the extracted search results may provide further understanding/insight to the field of interest of the user. Additionally, the search query is in text format. Optionally, the search query may be provided using a command prompt (cmd), user-interface (UI) and so forth. More optionally, the search query may be provided in an image format, an audio input and so forth.

Throughout the present disclosure, the term "user-interface" (UI) relates to a structured set of user-interface elements rendered on a display screen of the computing device. Optionally, the user-interface (UI) rendered on the display screen is generated by any collection or set of instructions executable by an associated computing device. Additionally, the user-interface (UI) is operable to interact with the user to convey graphical and/or textual information and receive input/search query from the user. Specifically, the user-interface (UI) used herein is a graphical user-interface (GUI). Furthermore, the user-interface (UI) elements refer to visual objects that have a size and position in the user-interface (UI). A user-interface element may be visible, though there may be times when the user-interface element is hidden or overlaid on other user-interface elements. Examples of user-interface elements may include, but are not limited to, text blocks, input area, labels, text boxes, list boxes, lines, images windows, dialog boxes, frames, panels, menus, buttons, icons. In addition to size and position, user-interface element may have other properties, such as a margin, spacing, and the like. In an embodiment, the computing device comprises display for rendering at least first user-interface and second user-interface.

As mentioned previously, the method and system comprises presenting information related to the search, wherein the user is operable to perform the search on the computing device using the search query. The method comprises providing the first input area, for receiving the search query from the user, on the first user-interface of the computing device. In an embodiment, the computing device is operable to provide the first user-interface comprising the first input area for receiving the search query from the user. Specifically, the first input area is configured to receive input from the user in the form of search query. Moreover, the user initiates the search by providing the search query in the first input area. Additionally, the first input area is configured to provide suggestions related to the search query to the user to improve the search results obtained thereof.

Throughout the present disclosure, the terms "query segments" and "relations" relates to one or more query segments (namely, fragments, elements, phrases and so forth) and contextual (namely, conceptual, semantic and so forth) associations therebetween contained in the received search query therein. Specifically, one or more portions of the search query are associated to form a query segment wherein the one or more portions have a significant contextual meaning. Additionally, lexical variants, word stems and so forth may be analyzed in order to standardize (namely, bringing to a canonical form) the one or more query segments. Furthermore, relations between the query segments are configured using relational operators such as "and", "or", "not", and the like based on lexical variations or contextual meaning of the one or more query segments obtained thereof. Additionally, the computing device is operable to identify the one or more query segments and relations therebetween. In an example, the search query may be "Erbitux lung cancer not colorectal cancer". Therefore in such example, the computing device may identify "Erbitux", "lung cancer" and "colorectal cancer" as the query segments. Furthermore, the relational operator between the query segments "Erbitux", "lung cancer" may be "and". Similarly, the relational operator between the query segments "lung cancer", "colorectal cancer" may be "not".

As mentioned previously, the method comprises displaying one or more query segments and relations between the one or more query segments on the second area of the first user-interface. The computing device displays one or more query segments and relations between the one or more query segments on the second area of the first user-interface. Furthermore, the relational operators such as "and", "or", "not", and the like are included in the second area of the first user-interface to observe multiple combinations between the one or more query segments. Specifically, the second area of the first user interface allows the user to toggle between the relational operators to improve the search query thereby.

In an embodiment, the user is operable to disable the one or more query segments, displayed in the second area, based on a selection input of the one or more query segments, wherein the disabled one or more query segments are re-enabled based on a further selection input. Specifically, the second area of the user interface allows the user to disable one or more query segments using a selection input, wherein when a query segment is disabled, the query segment may be excluded from the search. Consequently, the search results relating to the query segment may not be extracted. Additionally, the user is operable to re-enable the disabled query segment based on a further selection input of disabled query segment.

As mentioned previously, the method comprises developing the received search query to obtain the one or more query segments and the relations between the one or more query segments. In an embodiment, the computing device is operable to develop the received search query to obtain the one or more query segments and the relations between the one or more query segments. Optionally, the search query may be then expanded to include all known synonyms, relationships and so forth to enhance result coverage. For example, metformin may be expanded to include "metformin hydrochloride", brand name "Glumetza" and so forth. Furthermore, the one or more query segments are then combined with their known relationships (namely, concepts, class, tags and so forth) in the ontology. Beneficially, tagging the one or more query segments associated with the at least one class provides a more organized, assembled and manageable form of the search query. Consequently, tagging provides an easier understanding of contextual (namely, inferred) meaning of the one or more query segments of the search query. Beneficially, the association of the one or more query segments provides wider understanding regarding the inferred meaning of the search query.

Throughout the present disclosure, the term "ontology" relates to a set of concepts (namely, information, ideas, data, semantic associations and so forth) in a field (namely, subject area, domain and so forth) that details types and properties of the set of concepts and semantic association thereof. Furthermore, ontology provides a base for performing search to extract information in the form of search results pertaining to the field of interest of the user. Moreover, ontology provides a structured, optimal and relevant set of concepts along with their properties and relations in defined set of categories, pertaining to the field of interest of the user. Furthermore, ontology may be used in scientific research, academic studies, market analysis and so forth. Optionally, ontology may include concepts in form of text, image, audio, video, or any combination thereof. Additionally, the ontology may provide information on an association of a certain concept in a certain field with one or more concepts in multiple fields.

Optionally, the method comprises developing the received search query by segmenting the received search query to obtain the one or more query segments based on the ontology. More optionally, the computing device is operable to develop the received search query by segmenting the received search query to obtain the one or more query segments based on the ontology. Specifically, developing the search query comprises converting the search query into machine-readable format. Beneficially, converting the search query in the machine readable format ensures a faster and efficient technique for obtaining the search results. Moreover, converting the search query into machine-readable format may be carried out by parsing and cleaning the one or more query segments. In an example, the search query may be converted in JSON or other convenient format. Consequently, the one or more query segments are identified with tags (namely, text, symbol, identifier and so forth) based on concepts established in the ontology. Furthermore, the search query includes the one or more query segments having specific conceptual significance therein.

Optionally, developing the received search query comprises identifying semantic associations between the one or more query segments to obtain relations therebetween based on the ontology. Furthermore, the one or more query segments are associated together based on contextual meaning thereof. The semantic associations between the one or more query segments are based on the context of the at least one tag. Optionally, the computing device is operable to identify semantic associations between the one or more query segments to obtain relations therebetween based on the ontology. In an example, a user provides a search query "John Smith publications related to metformin and diabetes". Furthermore, "John Smith" may be identified as a specific author; "publications" may be identified as output data set; "metformin" may be identified as a drug; "diabetes" may be identified as an indication and "related to" and "and" are operators. Thus, the search query is segmented into query segments based on the ontology and by identifying semantic associations between the one or more query segments.

Throughout the present disclosure, the term "database arrangement" used herein relates to an organized body of digital information regardless of the manner in which the data or the organized body thereof is represented. The database arrangement relates to programmable and/or non-programmable components configured to execute one or more software application for storing, processing and/or share data and/or set of instructions. Additionally, the database arrangement includes one or more data processing facilities for storing, processing and/or share data and/or set of instructions. Optionally, the database arrangement may be hardware, software, firmware and/or any combination of these, suitable for storing and processing various information and services accessed by the one or more user using the one or more computing device. For example, the organized body of related data may be in the form of a table, a map, a grid, a packet, a datagram, a file, a document, a list or in any other form. Optionally, the database arrangement includes functional components, for example, a processor, a memory, a network adapter and so forth. Furthermore, the database arrangement refers to the software program for creating and managing one or more databases. Optionally, the database arrangement may be operable to support relational operations, regardless of whether it enforces strict adherence to the relational model, as understood by those of ordinary skill in the art. Optionally, the database arrangement may be used interchangeably herein as database management system, as is common in the art. Furthermore, the database management system refers to the software program for creating and managing one or more databases. The database arrangement is operable to store at least one database. Moreover, the database arrangement includes any data storage software and systems, such as, for example, a relational database like IBM DB2 and Oracle 9. Optionally, the at least one database is structured and/or unstructured.

Throughout the present disclosure, the term "communication module" relates to an arrangement of interconnected programmable and/or non-programmable components that are configured to facilitate data communication between one or more computing devices, software modules and/or databases, whether available or known at the time of filing or as later developed. Additionally, the communication module includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, although the system is frequently described herein as being implemented with TCP/IP communication protocols, the system may also be implemented using IPX, Appletalk, IP-6, NetBIOS, OSI, any tunneling protocol (e.g. IPsec, SSH), or any number of existing or future protocols. Furthermore, any other suitable protocols using voice, video, data, or combinations thereof, can also be employed. The communication module is operable to retrieve at least one database; wherein the communication module is operatively coupled to the computing device.

The method comprises extracting search results from at least one database, based on the developed search query. The computing device is operable to extract search results from at least one database, based on the developed search query. Additionally, the communication module is operable to communicate with the computing device the extracted search results from at least one database in the database arrangement. The developed search query contains query segments and semantic associations identified therebetween which form the base for extracting search results therefrom. Consequently, query segments are identified in the database which is accordingly extracted to form the search results. In an example, a user provides search query "metformin and diabetes". Based on the ontology, query segments are identified as "metformin" and "diabetes" and the semantic association between the segments is identified. In an instance, search results extracted from the database contain query segments "metformin" and "diabetes" therein.

The method comprises providing an arranged set of extracted search results in a third area of the first user-interface, wherein the extracted search results are arranged based on one or more parameters associated therewith. Specifically, the extracted search results are arranged to provide the user a structured view of the search results. Furthermore, the user may select (namely, apply, enable) one or more parameters associated with the extracted search results to arrange the extracted search results in an arranged set. Beneficially, it provides comfort to the user to modify the search results without essentially altering the search query. The computing device is operable to provide an arranged set of extracted search results in the third area of the first user-interface, arranged based on one or more parameters associated with the extracted search results. Optionally, the arranged set of results based on one or more parameters may be available in a separate tab in the third area of the first user-interface. Additionally, the third area may be arranged in tandem with the second or fourth area in the first user interface. Furthermore, the second, third and fourth area of the first user interface appear in no specific order and can be re-numbered as commonly understood by those skilled in the art.

In an embodiment, the one or more parameters may modify an order of appearance of the extracted search results. In another embodiment, one or more parameters may change the set of extracted search results available to the user. Furthermore, arrangement of the search results can be carried out on the basis of one or more parameters. Specifically, the parameters may be user defined to further enhance the extracted search results to the field of interest of the user. In one embodiment, the parameter may be 'Publications'. In such an embodiment, the search results will be arranged on the basis of publications contained/appearing in the extracted search results. In another embodiment, the parameter may be 'Clinical Trials'. In such an embodiment, search results will be arranged based on the clinical trials contained/appearing in the extracted search results. In one embodiment, the parameter may be 'Congresses'. In such an embodiment, the search results available to the user would be arranged in the order of appearance in congresses. In another embodiment, the parameter may be 'Thesis and Dissertations'. In such an embodiment, the search results available to the user would be arranged in the order of thesis and dissertations contained in the extracted search results. In yet another embodiment, the parameter may be 'Bookmark'. In such an embodiment, the user may arrange the extracted search results in the order of preference of specifically bookmarked search results. Furthermore, in one embodiment, the parameter may be 'Filter by year'. In such an embodiment, the extracted search results will be arranged in the order of the year of publication.

Throughout the present disclosure, the term "concepts" used herein relates to a set of terms identified from the search results by analyzing the extracted search results. In an embodiment, the computing device is operable to analyze the extracted search results. Specifically, the extracted search results are analyzed to identify concept associated therewith. Optionally, the method for analyzing the extracted search results to identify the one or more concepts comprises identifying one or more keywords associated with each of the extracted search results based on at least one factor associated with the keywords. In one embodiment, the factor may be 'frequency of occurrence' of the keyword in the search result. In such an embodiment, if a term 'skin cancer' appears for a total of 20 times in the search result, it is then considered as a keyword owing to the factor of its high frequency of occurrence. In another embodiment, the factor may be 'relevance' of the keyword in the search result. In yet another embodiment, the factor may be 'position of occurrence' of the keyword in the search result. In yet another embodiment, the factor may be 'current trend' of the keyword in the search result. In an embodiment, the computing device is operable to identify the one or more concepts associated with each of the extracted search results by identifying one or more keywords associated with each of the extracted search results based on at least one factor associated with the keywords. Specifically, one or more keywords associated with at least one factor in the set of extracted search results are classified to broadly represent concept classes thereof. Optionally, the method is operable to identify the one or more concepts from the identified one or more keywords associated with each of the extracted search results. Specifically, the identified keywords are then compiled to represent concepts. Optionally, the computing device is operable to identify the one or more concepts from the identified one or more keywords associated with each of the extracted search results. Optionally, the computing device is operable to determine popular (namely, trending) concepts related to a specific search and subsequently, display to the user.

As mentioned previously, the method comprises providing a list of one or more concepts associated with the extracted search results in a fourth area of the first user-interface, wherein the extracted search results are analyzed to identify the one or more concepts associated with each of the extracted search results. The computing device is operable to provide a list of one or more concepts associated with the extracted search results in a fourth area of the first user-interface, wherein the extracted search results are analyzed to identify the one or more concepts associated with each of the extracted search results. In an embodiment, the computing device is operable to crawl the extracted search results to identify the one or more concepts associated with each of the extracted search results.

Throughout the present disclosure, the term "concept class" used herein relates to a collection (namely, cluster, group and so forth) of contextually similar concepts thereof. Furthermore, the concept class may include many synonyms, abbreviations, linguistic variations, morphological forms and/or derivational entities for the plurality of concepts associated therewith. Optionally, providing the list of one or more concepts associated with the extracted search results comprises classifying the one or more concepts in at least one concept class based on the ontology. Specifically, concept classes represent the classification of concepts therein. In an example, the concepts "lung cancer", "colorectal cancer", "tuberculosis" may be classified into the concept class "disease". Optionally, the computing device provides the list of one or more concepts associated with the extracted search results by classifying the one or more concepts in at least one concept class based on the ontology. In an embodiment, the concept class may be 'Gene'. In such an embodiment, the concepts included in the concept class may be BRCA1, BRCA2, MYH7 and the like. In another embodiment, the concept class may be 'Indication'. In such an embodiment, the concepts included may be Skin Toxicity, rashes, and the like.

Optionally, the method further comprises filtering the extracted search results based on selected at least one concept, in response to a user input of selection of at least one concept from the list of one or more concepts associated with the extracted search results. Specifically, the user input is provided in the form of inclusion or exclusion of concepts from the list of one or more concepts in the fourth area of the first user-interface. In an embodiment, the user may include all concepts from the concept class 'Gene' except 'BRCA1'. In another embodiment, the user may exclude concepts 'Skin Toxicity' and 'Squamous Cell Carcinoma' from the concept class 'Indication'. Beneficially, the user is able to improve the search results to suit the user's field of interest. More optionally, the computing device is further operable to filter the extracted search results based on selected at least one concept, in response to a user input of selection of at least one concept from the list of one or more concepts associated with the extracted search results.

As mentioned previously, the method comprises providing information, related to selected search result or selected concept, on the second user-interface, in response to the selection input, from the user, based on one of a search result or a concept associated with the search results. Specifically, the term "selection input from the user" used herein relates to the selection input provided by the user to select either particular search result from the arranged set of search results or particular concept from the list of concepts on the first user-interface. Optionally, the computing device is operable to provide information, related to the selected search result or the selected concept, on the second user-interface, in response to the selection input from the user based on one of a search result or a concept associated with the search results. Moreover, the computing device may provide information related to the selected concept or the selected search result from the at least one database.

Optionally, the method further comprises providing toggle operation on the second user-interface, wherein the user is operable to toggle from the second user-interface to the first user-interface. Furthermore, the toggle operation allows smooth transition between multiple interfaces. Additionally optionally, the computing device is operable to provide toggle operation on the second user-interface, wherein the user is operable to toggle from the second user-interface to the first user-interface.

The information related to the selected search result comprises summary of the selected search result. Specifically, the summary is concise information of the selected search result. The computing device is operable to provide information comprising summary of the selected search result. The information related to the selected search result comprises one or more documents associated with the selected search result. Optionally, the one or more associated documents are the documents similar to the selected search result available from different sources. The computing device is operable to provide information comprising one or more documents associated with the selected search result. The information related to the selected search result comprises concepts associated with the selected search result. Additionally, the summary encompasses the concepts appearing therein. The computing device is operable to provide information comprising concepts associated with the selected search result.

The information related to selected concept comprises summary of the selected concept. In addition, the computing device is operable to provide information related to the selected concept comprising a summary of the selected concept. Specifically, the summary gives concise information on the selected concept. The information related to selected concept comprises one or more documents associated with the selected concept. In an embodiment, the computing device is operable to provide information related to the selected concept comprising one or more documents associated with the selected concept. Beneficially, it assists the user in accessing similar documents from various sources related to the selected concept. Furthermore the one or more documents associated with the selected concept and the selected search result may include aggregated documents related thereto. Specifically, the selected search concept or selected search result may relate to a document published on multiple platforms. Therefore, the one or more documents may include the associated with the selected concept and the selected search result may include such document with links for the multiple platforms published therewith.

Optionally, the method further comprises providing list of browsed search results on the second user-interface. Furthermore, the browsed search results are arranged either in the order of chronology or in the order of relevance of the accessed search result. Optionally, it provides the user, access to previously accessed similar documents related to a selected search result or selected concept on the second user-interface. Subsequently, it provides a comprehensive path of the accessed documents such that the user can track backwards to identify root search query and vice versa. Additionally optionally, the computing device is further operable to provide a list of browsed search results on the second user-interface.

In an embodiment, the method further comprises presenting information related to a plurality of searches over a predefined period of time in a relation-based structure. Specifically, the relations between the plurality of searches may be determined and presented on the relation-based structure. Furthermore, the user is operable to define the predefined period of time. Consequently, the plurality of searches performed over the predefined period of time are analyzed. Specifically, the plurality of search queries of the plurality of searches, at least one selected search result, at least one selected concept and so forth may be analyzed and such information may be presented on the relation-based structure. Beneficially, the relation-based structure enables efficient navigation therethrough to track the plurality of searches performed by the user. Furthermore, the selected search results in the plurality of searches may be effortlessly identified.

Furthermore, there is disclosed a computer readable medium containing program instructions for execution on a computer system, which when executed by a computer, cause the computer to perform method steps for presenting information related to a search, the method comprising the steps of providing a first input area, for receiving the search query from the user, on a first user-interface of the computing device; displaying one or more query segments and relations between the one or more query segments on a second area of the first user-interface, wherein the received search query is developed to obtain the one or more query segments and the relations between the one or more query segments; providing an arranged set of extracted search results in a third area of the first user-interface, wherein search results are extracted, from at least one database, based on the developed search query and arranged based on one or more parameters associated with the extracted search results; providing a list of one or more concepts associated with the extracted search results in a fourth area of the first user-interface, wherein the extracted search results are analyzed to identify the one or more concepts associated with each of the extracted search results; and providing information, related to a selected search result or a selected concept, on a second user-interface, in response to a selection input, from the user, based on one of a search result or a concept associated with the search results. The information related to the selected search result comprises a summary of the selected search result; one or more documents associated with the selected search result; and concepts associated with the selected search result. The information related to the selected concept comprises a summary of the selected concept; and one or more documents associated with the selected concept.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Figure 1:
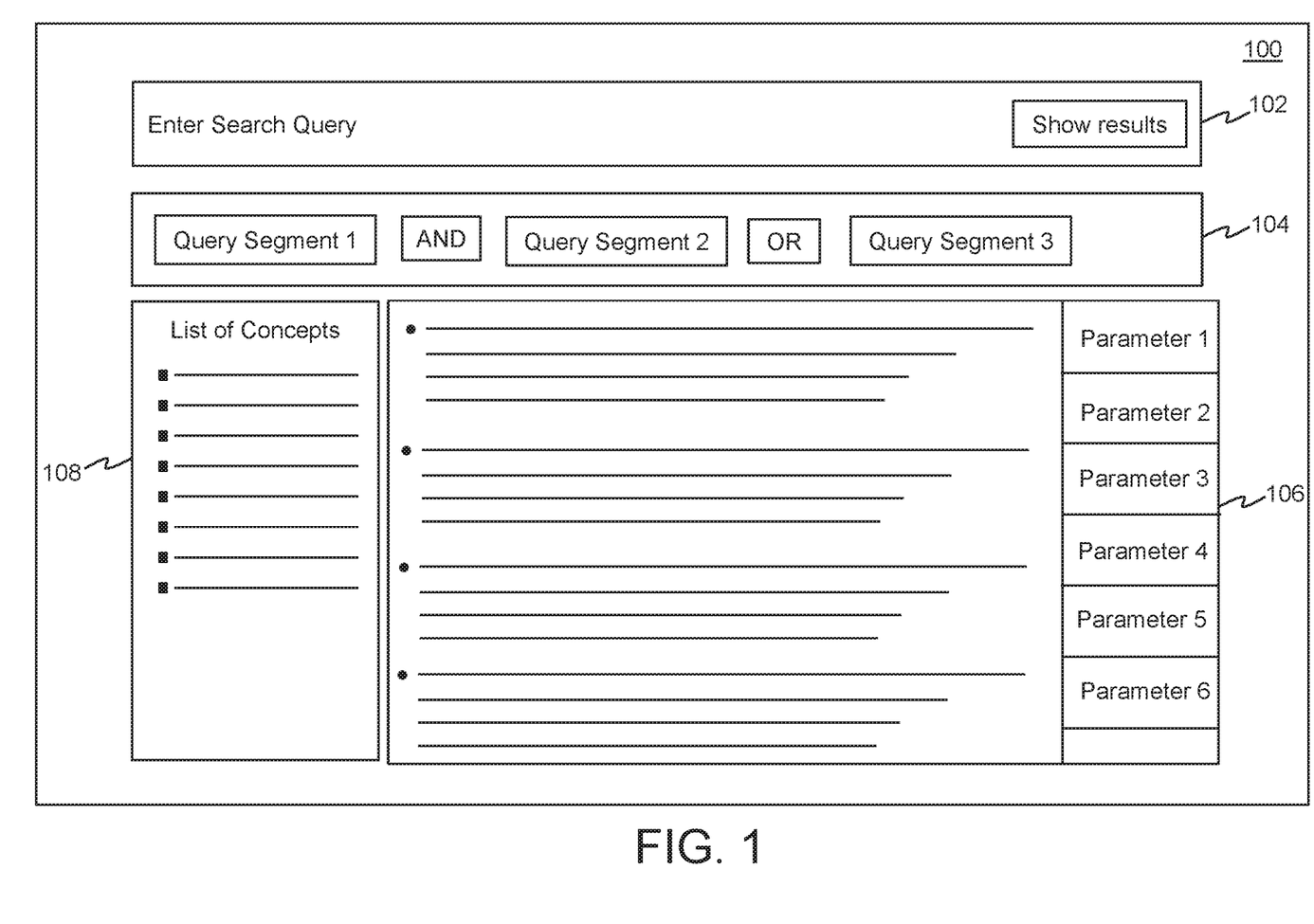
FIG. 1 is a schematic illustration of a first user-interface for presenting information related to a search, in accordance with an embodiment of the present disclosure.

Referring to FIG. 1, there is shown a schematic illustration of a first user-interface 100 for presenting information related to a search, in accordance with an embodiment of the present disclosure. The first user-interface 100 is rendered on the display of computing device. The first user-interface 100 includes a first input area 102, for receiving the search query from the user. Furthermore, one or more query segments and relations between the one or more query segments are displayed on a second area 104 of the first user-interface 100, wherein the received search query is developed to obtain the one or more query segments and the relations between the one or more query segments. The first user-interface 100, provides an arranged set of extracted search results in a third area 106, wherein search results are extracted, from at least one database, based on the developed search query and arranged based on one or more parameters associated with the extracted search results. Moreover, a list of one or more concepts associated with the extracted search results are provided in a fourth area 108, of the first user-interface 100, wherein the extracted search results are analyzed to identify the one or more concepts associated with each of the extracted search results.

Figure 2:
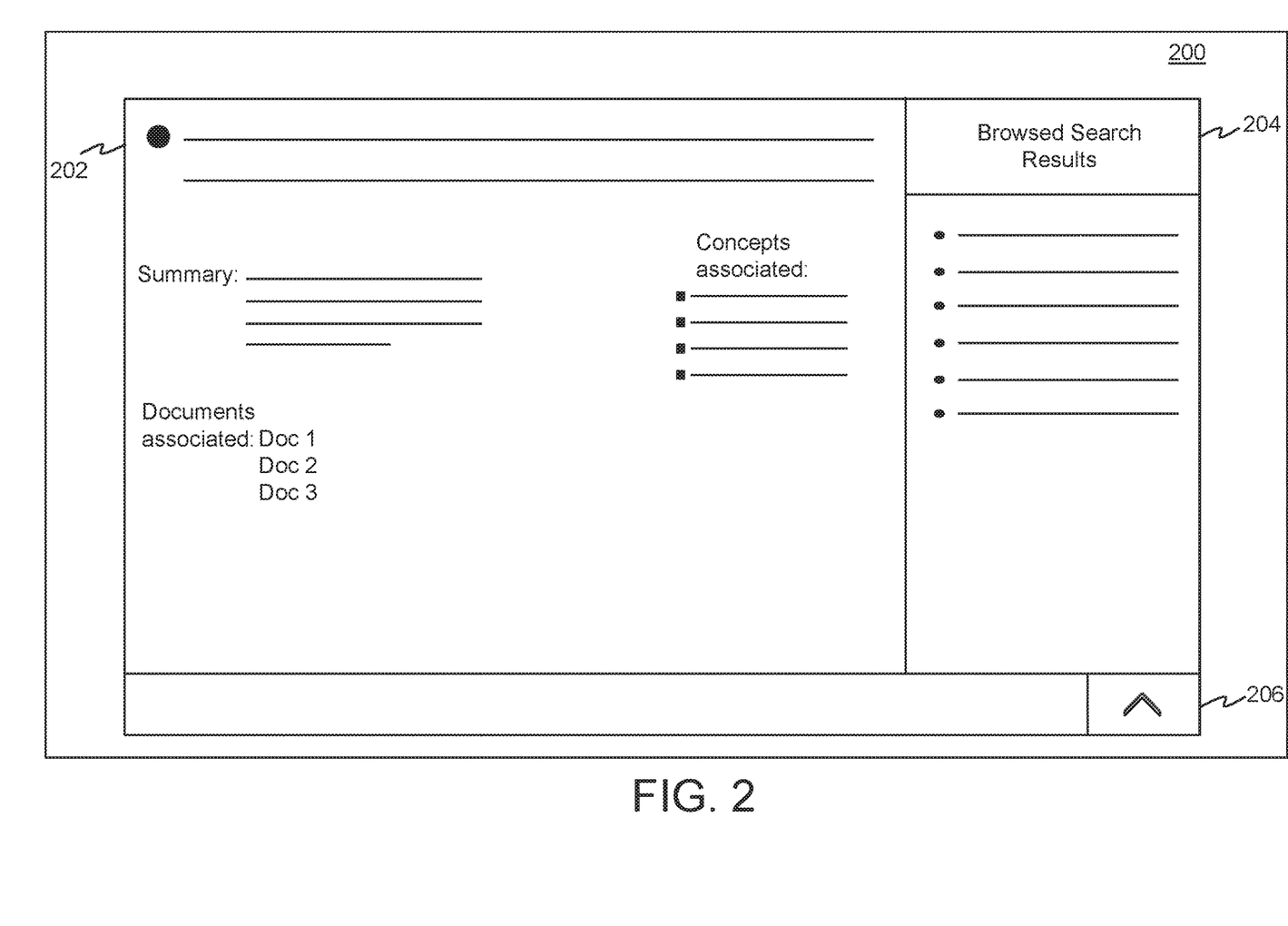
FIG. 2 is a schematic illustration of a second user-interface for providing information related to a selected search result in response to a selection input from the user, in accordance with an embodiment of the present disclosure.

Referring to FIG. 2, there is shown a schematic illustration of a second user-interface 200 for providing information related to a selected search result 202 in response to a selection input from the user, in accordance with an embodiment of the present disclosure. The information related to the selected search result 202 comprises a summary of the selected search result, one or more documents associated with the selected search result and concepts associated with the selected search result. The second user-interface 200 further provides a list of browsed search results 204 of the user. Additionally, a toggle operation 206 is provided on the second user-interface, wherein the user is operable to toggle from the second user-interface 200 to the first user-interface 100 using the toggle operation 206.

Figure 3:
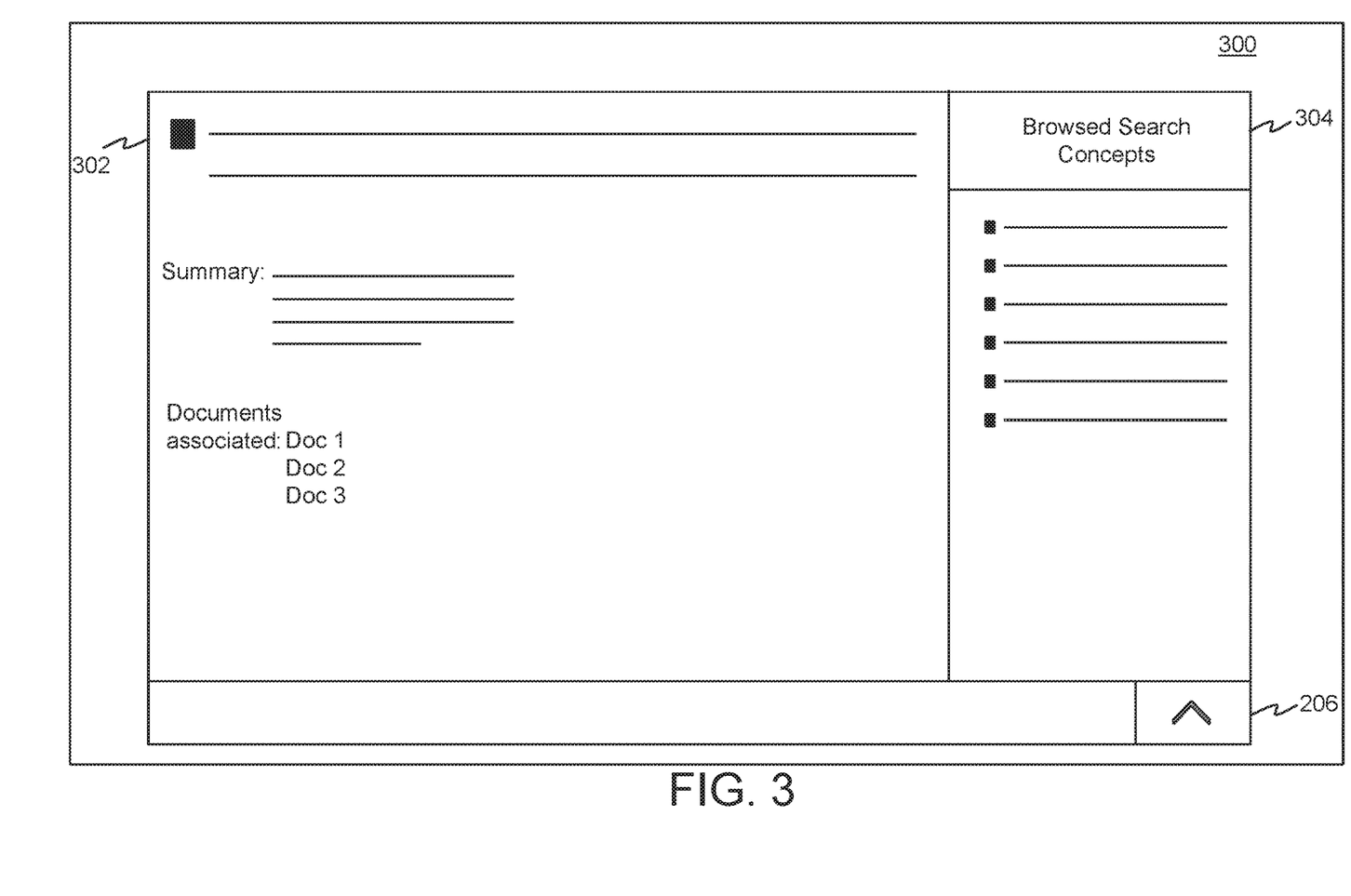
FIG. 3 is a schematic illustration of a second user-interface for providing information related to a selected search concept in response to a selection input from the user, in accordance with an embodiment of the present disclosure.

Referring to FIG. 3, there is shown a schematic illustration of a second user-interface 300 for providing information related to a selected search concept 302 in response to a selection input from the user, in accordance with an embodiment of the present disclosure. The information related to the selected concept 302 comprises a summary of the selected concept and one or more documents associated with the selected concept 302. The second user-interface 300 further provides a list of browsed search concepts 304. Additionally, a toggle operation 206 is provided on the second user-interface 300, wherein the user is operable to toggle from the second user-interface 300 to the first user-interface 100.

Figure 4:
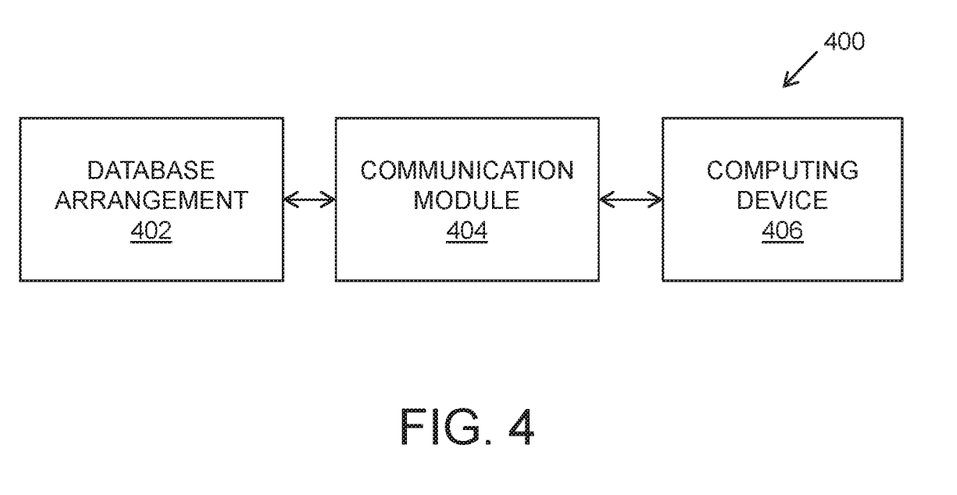
FIG. 4 is a block diagram of a system of presenting an information related to a search, in accordance with an embodiment of the present disclosure.

Referring to FIG. 4, there is shown a block diagram of a system 400 of presenting an information related to a search, in accordance with an embodiment of the present disclosure. A user is operable to perform the search on a computing device using a search query. The system 400 comprises a database arrangement 402 operable to store at least one database. Furthermore, the system 400 comprises a communication module 404. The communication module 404 is operatively coupled to the computing device 406 and the database arrangement 402. The communication module 404 is operable to retrieve at least one database from the database arrangement 402. Moreover, the computing device 406 comprises a display for rendering at least a first user-interface and a second user-interface.

Figure 5:
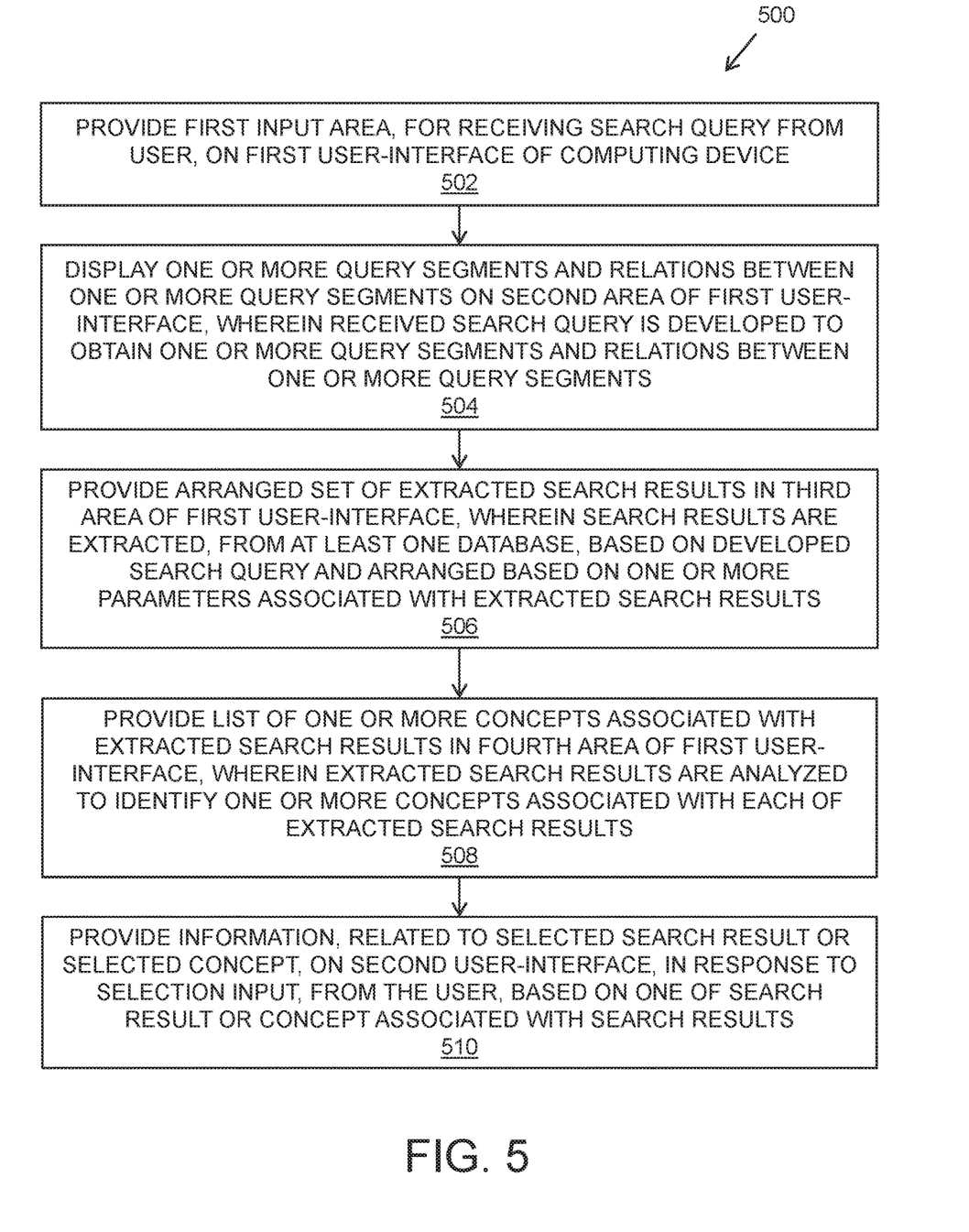
FIG. 5 is an illustration of steps of a method of presenting an information related to a search, in accordance with an embodiment of the present disclosure.

Referring to FIG. 5, illustrated are steps of a method 500 of presenting an information related to a search, in accordance with an embodiment of the present disclosure. A user is operable to perform the search on a computing device using a search query. At a step 502, a first input area, for receiving the search query from the user, is provided on a first user-interface of the computing device. At a step 504, one or more query segments and relations between the one or more query segments are displayed on a second area of the first user-interface. The received search query is developed to obtain the one or more query segments and the relations between the one or more query segments. At a step 506, an arranged set of extracted search results is provided in a third area of the first user-interface. The search results are extracted, from at least one database, based on the developed search query and arranged based on one or more parameters associated with the extracted search results. At a step 508, a list of one or more concepts associated with the extracted search results is provided in a fourth area of the first user-interface. The extracted search results are analyzed to identify the one or more concepts associated with each of the extracted search results. At step 510, information related to a selected search result or a selected concept, is provided on a second user-interface, in response to a selection input, from the user, based on one of a search result or a concept associated with the search results. Moreover, the information related to the selected search result comprises a summary of the selected search result, one or more documents associated with the selected search result, and concepts associated with the selected search result. Furthermore, the information related to the selected concept comprises a summary of the selected concept, and one or more documents associated with the selected concept.

The steps 502 to 510 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of presenting an information related to a search, wherein a user is operable to perform the search on a computing device using a search query, characterized in that the method comprises:
   providing a first input area, for receiving the search query from the user, on a first user interface of the computing device;
   displaying one or more query segments and relations between the one or more query segments on a second area of the first user interface, wherein the received search query is developed to obtain the one or more query segments and the relations between the one or more query segments;
   providing an arranged set of extracted search results in a third area of the first user interface, wherein search results are extracted, from at least one database, based on the developed search query and arranged based on one or more parameters associated with the extracted search results;

providing a list of one or more concepts associated with the extracted search results in a fourth area of the first user interface, wherein the extracted search results are analyzed to identify the one or more concepts associated with each of the extracted search results providing information, related to a selected search result or a selected concept, on a second user interface, in response to a selection input, from the user, based on one of a search result from the arranged set of extracted search results in the third area of the first user interface or a concept from the list of one or more concepts associated with extracted search results in the fourth area of the first user interface, wherein:
the information, provided on the second user interface, related to the selected search results comprises:
a summary of the selected search result;
one or more documents associated with the selected search result; and
concepts associated with the selected search result; or
the information, provided on the second user interface, related to the selected concept comprises:
a summary of the selected concept; and
one or more documents associated with the selected concept; and providing a toggle operation on the second user interface, wherein the toggle operation enables the user to toggle from the second user interface to the first user interface.

2. A method of claim 1, wherein the method further comprises providing a list of browsed search results or browsed search concepts on the second user interface.

3. A method of claim 1, wherein the method further comprises filtering the extracted search results based on selected at least one concept, in response to a user input of selection of at least one concept from the list of one or more concepts associated with the extracted search results.

4. A method of claim 1, wherein developing the received search query comprises:
segmenting the received search query to obtain the one or more query segments based on an ontology; and
identifying semantic associations between the one or more query segments to obtain relations therebetween based on the ontology.

5. A method of claim 1, wherein the at least one database is structured and/or unstructured.

6. A method of claim 1, wherein analyzing the extracted search results to identify the one or more concepts associated with each of the extracted search results comprises:
identifying one or more keywords associated with each of the extracted search results based on at least one factor associated with the keywords; and
identifying the one or more concepts from the identified one or more keywords associated with each of the extracted search results.

7. A method of claim 1, wherein providing the list of one or more concepts associated with the extracted search results comprises classifying the one or more concepts in at least one concept class based on the ontology.

8. A method of claim 1, wherein the user is operable to disable the one or more query segments, displayed in the second area, based on a selection input of the one or more query segments, wherein the disabled one or more query segments are re-enabled based on a further selection input.

9. A method of claim 1, wherein the method further comprises presenting information related to a plurality of searches performed over a predefined period of time in a relation-based structure.

10. A system for presenting an information related to a search, wherein a user is operable to perform the search on a computing device using a search query, wherein the system comprises:
a database arrangement operable to store at least one database;
a communication module operable to retrieve at least one database; wherein the communication module is operatively coupled to the computing device; and
the computing device comprising a display for rendering at least a first user interface and a second user interface, wherein the computing device is operable to:
provide a first user interface comprising a first input area for receiving the search query from the user;
display one or more query segments and relations between the one or more query segments on a second area of the first user interface, wherein the received search query is developed to obtain the one or more query segments and the relations between the one or more query segments;
provide an arranged set of extracted search results in a third area of the first user interface, wherein search results are extracted, from at least one database, based on the developed search query and arranged based on one or more parameters associated with the extracted search results;
provide a list of one or more concepts associated with the extracted search results in a fourth area of the first user interface, wherein the extracted search results are analyzed to identify the one or more concepts associated with each of the extracted search results;
provide information, related to a selected search result or a selected concept, on a second user interface, in response to a selection input, from the user, based on one of a search result from the arranged set of extracted search results in the third area of the first user interface or a concept from the list of one or more concepts associated with extracted search results in the fourth area of the first user, wherein:
the information, provided on the second user interface, related to the selected search result comprises:
a summary of the selected search result;
one or more documents associated with the selected search result; and
concepts associated with the selected search result; or
the information, provided on the second user interface, related to the selected concept comprises:
a summary of the selected concept; and
one or more documents associated with the selected concept; and
provide a toggle operation on the second user interface, wherein the toggle operation enables the user to toggle from the second user interface to the first user interface.

11. A system of claim 10, wherein the computing device is further operable to provide a list of browsed search results or browsed search concepts on the second user interface.

12. A system of claim 10, wherein the computing device is further operable to filter the extracted search results based on selected at least one concept, in response to a user input of selection of at least one concept from the list of one or more concepts associated with the extracted search results.

13. A system of claim 10, wherein the computing device is operable to develop the received search query by:
   segmenting the received search query to obtain the one or more query segments based on an ontology; and
   identifying semantic associations between the one or more query segments to obtain relations therebetween based on the ontology.

14. A system of claim 10, wherein the at least one database is structured and/or unstructured.

15. A system of claim 11, wherein the computing device is operable to analyze the extracted search results to identify the one or more concepts associated with each of the extracted search results by:
   identifying one or more keywords associated with each of the extracted search results based on at least one factor associated with the keywords; and
   identifying the one or more concepts from the identified one or more keywords associated with each of the extracted search results.

16. A system of claim 10, wherein providing the list of one or more concepts associated with the extracted search results comprises classifying the one or more concepts in at least one concept class based on the ontology.

17. A computer readable medium containing program instructions for execution on a computer system, which when executed by a computer, cause the computer to perform method steps for presenting an information related to a search, wherein a user is operable to perform the search on a computing device using a search query, the method comprising the steps of:
   providing a first input area, for receiving the search query from the user, on a first user interface of the computing device;
   displaying one or more query segments and relations between the one or more query segments on a second area of the first user interface, wherein the received search query is developed to obtain the one or more query segments and the relations between the one or more query segments;
   providing an arranged set of extracted search results in a third area of the first user interface, wherein search results are extracted, from at least one database, based on the developed search query and arranged based on one or more parameters associated with the extracted search results;
   providing a list of one or more concepts associated with the extracted search results in a fourth area of the first user interface, wherein the extracted search results are analyzed to identify the one or more concepts associated with each of the extracted search results;
   providing information, related to a selected search result or a selected concept, on a second user interface, in response to a selection input, from the user, based on one of a search result from the arranged set of extracted search results in the third area of the first user interface or a concept from the list of the one or more concepts associated with extracted search results in the fourth area of the first user interface, wherein:
      the information, provided on the second user interface, related to selected search result comprises:
         a summary of the selected search result;
         one or more documents associated with the selected search result; or
         concepts associated with the selected search result; or
      the information, provided on the second user interface, related to selected concept comprises:
         a summary of the selected concept; and
         one or more documents associated with the selected concept; and
   providing a toggle operation on the second user interface, wherein the toggle operation enables the user to toggle from the second user interface to the first user interface.

* * * * *